United States Patent Office 2,818,364
Patented Dec. 31, 1957

2,818,364

ALKYL PHOSPHITE ESTERS OF PERCHLOROMETHYL MERCAPTAN AND INSECTICIDAL COMPOSITIONS COMPRISING THE SAME

Gail H. Birum, Dayton, Ohio, assignor to Monsanto Chemical Company, St. Louis, Mo., a corporation of Delaware No Drawing. Application October 26, 1953
Serial No. 388,410

12 Claims. (Cl. 167—22)

The present invention relates to organic phosphorus compounds and deals more particularly with condensation products of perchloromethyl mercaptan and certain phosphorus-containing esters, to methods of producing the same, to insecticidal compositions comprising said condensation products and to methods of destroying insect pests in which said compositions are used.

According to the invention there are prepared new and valuable compounds by condensation of one mole of perchloromethyl mercaptan with from 1 to 4 moles of an ester of an acid of phosphorus having the formula (RO)$_2$—T in which R is an alkyl radical of from 1 to 6 carbon atoms and T is a radical selected from the class consisting of the —P—OR radical in which R is as herein defined, the radical —P—O—Me the radical

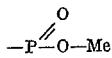

the radical

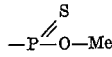

the radical

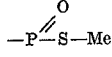

and the radical

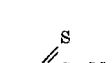

in which Me is an alkali metal.

As examples of compounds having the above formula and useful for the present purpose may be mentioned the trialkyl phosphites such as trimethyl, triethyl, triisopropyl, tributyl, tri-tert-amyl and trihexyl phosphite; the alkali metal dialkyl phosphites such as sodium diethyl phosphite, potassium di-n-butyl phosphite, lithium dimethyl phosphite and sodium dihexyl phosphite; the alkali metal dialkyl phosphates such as sodium dimethyl phosphate, lithium diisoamyl phosphate and potassium di-n-propyl phosphate; the alkali metal dialkyl phosphorothionates such as sodium dimethyl or potassium dibutyl phosphorothionate; the alkali metal dialkyl phosphorothiolates such as sodium O,O-diamyl or lithium O,O-dimethyl phosphorothiolate; the alkali metal O,O-dialkyl phosphorodithioates such as sodium O,O-dibutyl or potassium O,O-diethyl phosphorodithioate, etc.

The condensation products thus obtained are compounds in which from 1 to 4 of the chlorine atoms of the perchloromethyl mercaptan have been replaced by a radical selected from the class consisting of the radical 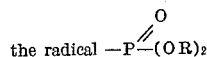

the radical 

the radical 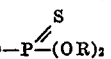

the radical 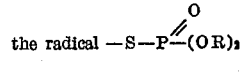

and the radical 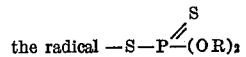

in which R is an alkyl radical of from 1 to 6 carbon atoms. Thus the condensation of one mole of perchloromethyl mercaptan with one mole of sodium diethyl phosphite or triethyl phosphite gives a condensate in which one mole of a chlorine atom of the mercaptan has been replaced by the

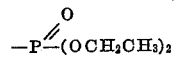

radical. The condensation of potassium O,O-di-n-amyl phosphorothiolate with the mercaptan gives a compound in which one or more of the chlorine atoms has been replaced by the

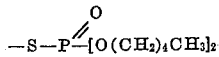

radical. When the phosphorus ester compound is sodium O,O-dimethyl phosphorodithioate, the condensate is one in which the chlorine is replaced by the

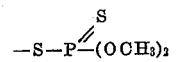

radical.

Condensation of the perchloromethyl mercaptan with the potassium ester takes place by replacement of from one to all four of the chlorine atoms of the perchloromethyl mercaptan by the phosphorus ester residue. When the phosphorus-containing reactant is an alkali metal dialkyl ester the reaction proceeds with the formation of an alkali metal chloride as by-product, the phosphorus-containing residue entering at the position formerly occupied by the displaced chlorine atom. When the phosphorus reactant is a trialkyl phosphite the reaction is believed to occur by primary addition of the perchloromethyl mercaptan to the trialkyl phosphite with formation of an intermediate, unstable addition product of the quasi phosphonium type which decomposes, with liberation of an alkyl chloride to form a condensation product which is the same as that obtainable by using an alkali metal dialkyl phosphite instead of the trialkyl phosphite in the condensation reaction.

The reaction conditions employed for the preparation of the present condensates varies with the nature of the individual reactants as well as with the degree of chlorine-replacement desired. Generally, however, the condensation reaction occurs by simply contacting the phosphorus ester compound with the perchloromethyl mercaptan, at ordinary room temperatures and allowing the resulting reaction mixture to stand until the desired condensate has been formed. When replacement of only one of the chlorine atoms is to be favored, it is advisable to use an excess of the perchloromethyl mercaptan with respect to the phosphorus ester reactant and to operate at low temperatures. The use of an inert diluent also favors the 1:1 condensation. As the temperature is increased from say, around 0° C., the quantity of perchloromethyl mercaptan decreased, and the amount of diluent reduced or entirely eliminated, the tendency for poly-substitution of the mercaptan chlorine is facilitated. Tetra-substitution may require heating, at say, temperatures of from 40° C. to the refluxing temperature of the reaction mixture. For optimum formation of the tetra-substituted products the reaction time varies with the nature of the individual phosphorus-containing ester, with the quantity of mercaptan used, the presence or absence of an extraneous diluent, etc.; but, it may be readily ascertained by noting cessation in the formation of by-product alkali metal chloride or alkyl chloride. While, as will be shown hereinafter, it is possible to obtain primarily 1:1 condensates or primarily 1:4 condensates, in most instances the condensation reaction leads to the formation of mixtures representing various degrees of chlorine substitution.

The present condensates are stable, limpid to highly viscous materials which may be used for a wide variety of industrial and agricultural purposes, for example, as plasticizers for synthetic resins and plastics, as lubricant oil additives, and as biological toxicants. They are most advantageously employed as insecticides, being particularly toxic to mites and leaf-feeding insects when applied as a spray. While some of the present compounds possess a systemic effect when applied to plants, others have little if any systemic action. Generally, the present condensates are not phytotoxic.

In preparing the perchloromethyl mercaptan-phosphorus ester condensates, I prefer to operate substantially as follows:

The perchloromethyl mercaptan is contacted gradually with the phosphorous ester reactant at ordinary or decreased temperatures and change of viscosity or color of the reaction mixture is noted. The reaction mixture may be heated if formation of a concentrate having the desired degree of substitution has not been attained at the low temperatures. In many instances heating is unnecessary; the reactants are merely allowed to stand or stirred at room temperature for a period of say, from several hours to several days depending upon the degree of substitution desired. For poly-substitution it is generally desirable to accelerate the reaction by refluxing the reactants. Also, when employing the alkali metal salts as the phosphorus-containing reactant, it is often advantageous to work in the presence of the diluent originally employed in preparation of the alkali metal reactant. For example, when preparing the condensate, of say sodium phosphite and perchloromethyl mercaptan, the alkali metal salt may be prepared by treating diethyl phosphite in a diluent such as benzene, hexane or ether and the mixture of sodium diethyl phosphite and diluent thus obtained may be used directly in the condensation reaction by simply mixing it with the perchloromethyl mercaptan. As hereinbefore stated, a diluent may be generally employed to assure limited or mono-condensation; however, it is also useful as a means of moderating the initially vigorous reaction in a preparation having the formation of poly-substitution products as the ultimate end. When employing diluents in the reaction and having poly-substitution as the object it is generally advisable to bring the temperature of the reaction mixture to the refluxing point after the initially rapid reaction has subsided.

The condensation reaction may also be effected at increased or diminished pressure depending upon the type of condensate desired; however, the ease of reaction at ordinary atmospheric pressure generally requires no control of the reaction by pressure variation.

The present invention is further illustrated, but not limited, by the following examples:

*Example 1*

This example describes the 1:1 condensation of potassium O,O-diisopropyl phosphorodithioate

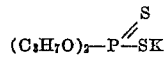

with perchloromethyl mercaptan.

Anhydrous ether (500 ml.) and the dithioate (76 g., 0.3 mole) were placed in a flask equipped with a stirrer, dropping funnel and condenser carrying a calcium chloride tube. To the resulting solution there was added, over a period of 20 minutes at 20–25° C., 48 g. (0.26 mole) of perchloromethyl mercaptan. After refluxing the whole for 1.5 hours the mixture was allowed to stand overnight and filtered. Ether was removed from the filtrate at reduced pressure and the residue was filtered to remove some cloudiness. The filtrate, 86.2 g. comprised the substantially pure O,O-diisopropyl S-trichloromethylmercapto phosphorodithioate, $n_D^{24}$ 1.5479 analyzing as follows:

|  | Found | Calcd. for $C_7H_{14}Cl_3O_2PS_3$ |
| --- | --- | --- |
| Percent C | 24.83 | 23.12 |
| Percent H | 4.37 | 3.88 |

The compound was found to be effective against milkweed bug and the 2-spotted mite. It possessed no phytocidal activity when used in the insecticidal concentrations.

*Example 2*

This example described the condensation of sodium diethyl phosphite with perchloromethyl mercaptan wherein all of the chlorine atoms of the mercaptan are replaced by the diethyl phosphite residue.

Sodium diethyl phosphite was prepared by adding 152 g. (1.1 mole) of diethyl phosphite to a suspension of 25.3 g. (1.1 mole) of sodium in about 400 ml. of dried benzene at refluxing temperatures. Refluxing was continued for an hour after addition of the phosphite had been completed. At the end of that time about 1 g. of unreacted sodium was removed from the reaction mixture and the mixture was then allowed to cool in an ice bath. To the cooled benzene solution of sodium diethyl phosphite there was then added 46.5 g. (0.25 mole) of perchloromethyl mercaptan during 1.75 hours. After allowing the whole to stand overnight at room temperature, it was refluxed for 1.5 hours, subsequently cooled to 0° C. and washed twice with 150 g. portions of ice-water. The organic layer was separated, dried and distilled to a pot temperature of 98° C./0.7 mm. to yield as residue 71.9 g. of the green, viscous reaction product of one mole of the perchloromethyl mercaptan with 4 moles of the sodium diethyl phosphite, $n_D^{25}$ 1.4528, and analyzing as follows:

|  | Found | Calcd. for $C_{17}H_{40}O_{12}P_4S$ |
| --- | --- | --- |
| Percent P | 20.19 | 20.9 |
| Percent S | 6.43 | 5.4 |
| Percent Cl | 0.92 | 0.0 |

The above analysis corresponds well with the following structure for the 1:4 perchloromethyl mercaptan-diethyl phosphite condensation product

*Example 3*

This example describes the preparation of a mixture of condensation products of perchloromethyl mercaptan with from 1 to 4 moles of triethyl phosphite.

To ice-cooled, freshly distilled triethyl phosphite (B. P. 54–59° C./17 mm.), 83 g. (0.5 mole), there was added dropwise 93 g. (0.5 mole) of perchloromethyl mercaptan. The initially vigorous reaction subsided after about one-third of the mercaptan had been introduced, there being no indication of reaction during the remainder of the addition. After being allowed to stand overnight the reaction mixture was heated to 115° C. within 45 minutes and maintained at a temperature of 105–150° C. for 1.5 hours. During this time a slight darkening of the reaction mixture occurred. Subsequent distillation to remove material boiling below a pot temperature of 95°

C./0.2 mm. gave as residue 96 g. of a mixture of perchloromethyl mercaptan-triethyl phosphite condensates $n_D^{25}$ 1.5132, $d_4^{20}$ 1.560, and analyzing as follows:

|  | Found | Calcd. for $C_5H_{10}Cl_2O_3PS$ (mono-substitution product) |
|---|---|---|
| Percent S | 13.25 | 11.15 |
| Percent Cl | 30.53 | 36.97 |

Example 4

This example describes the preparation of a mixture of condensates from perchloromethyl mercaptan and sodium dibutyl phosphorothionate.

A hexane solution of sodium dibutyl phosphite was prepared by adding dropwise 189 g. (0.975 mole) of dibutyl phosphite to 22.4 g. (0.975 mole) of sodium in 500 ml. of hexane during 45 minutes, and then warming the resulting mixture at reflux for 20 hours. One-half of the solution was then added during 30 minutes to a mixture consisting of 150 ml. of hexane and 16 g. (0.5 mole) of sulfur. During the addition, the whole was warmed to refluxing temperature. The sodium dibutyl phosphorothionate solution thus obtained was then cooled in an ice bath. To the cooled solution there was added 93 g. (0.5 mole) of perchloromethyl mercaptan during 1.25 hours, and the resulting mixture was warmed at reflux for 3 hours. The resulting product was worked up by stirring it with a filter aid, filtering and concentration of the filtrate in a Claisen flask, first under water pump pressure and finally at a pot temperature of 85° C./1.0 mm. The residue consisted of 108 g. of a brown, viscous liquid $n_D^{25}$ 1.4875, and analyzing as follows:

|  | Found | Calcd. for $C_9H_{18}Cl_3O_3S_2$ (mono-substitution product) |
|---|---|---|
| Percent S | 13.74 | 17.07 |
| Percent Cl | 14.02 | 28.29 |

Example 5

This example describes the preparation of a mixture of condensation products from perchloromethyl mercaptan and sodium diethyl phosphite.

To an ice-cooled solution of 80 g. (0.5 mole) of sodium diethyl phosphite in 300 ml. of hexane there was added during 45 minutes 93 g. (0.5 mole) of perchloromethyl mercaptan. After addition of the mercaptan was completed, the mixture was refluxed for 4 hours, cooled and filtered. Distillation of the filtrate to a pot temperature of 105° C./0.3 mm. gave a dark red liquid residue $n_D^{25}$ 1.4879, $d_4^{20}$ 1.437, and analyzing as follows:

|  | Found | Calcd. for $C_5H_{10}Cl_3O_3PS$ (mono-substitution product) |
|---|---|---|
| Percent S | 11.51 | 11.15 |
| Percent Cl | 18.89 | 36.97 |

Example 6

This example describes the preparation of a condensation product of one mole of perchloromethyl mercaptan with from 1 to 4 moles of sodium dibutyl phosphite.

Sodium dibutyl phosphite was prepared by adding dropwise 189 g. (0.975 mole) freshly distilled dibutyl phosphite, B. P. 114–117° C./9 mm. to 22.4 g. (0.975 mole) of a suspension of sodium in 500 ml. of hexane and subsequently refluxing the mixture for 20 hours.

One-half of the hexane solution of sodium dibutyl phosphite thus obtained was gradually added during 2 hours with ice-cooling to a solution of 93 g. (0.5 mole) of perchloromethyl mercaptan in 100 ml. of hexane. The whole was then heated to reflux (71° C.) within 1.5 hours and refluxing was continued for an additional 5.5 hours. The reaction mixture was treated with a filter aid, cooled to room temperature and filtered. Distillation of the filtrate to a pot temperature of 90° C./1 mm. gave as residue 97.5 g. of the brown liquid condensate, $n_D^{25}$ 1.4740, and analyzing as follows:

|  | Found | Calcd. for $C_9H_{18}Cl_2O_3PS$ (mono-substitution product) |
|---|---|---|
| Percent S | 5.83 | 9.33 |
| Percent Cl | 13.28 | 30.94 |

Example 7

This example describes the reaction of sodium diethyl phosphorothionate and perchloromethyl mercaptan.

Sodium diethyl phosphite was prepared by adding freshly distilled diethyl phosphite (138 g., 1.0 mole) during 1.5 hours to a refluxing suspension of 23 g. (1.0 mole) of sodium in 500 ml. of hexane, and then continuing the refluxing of the resulting reaction mixture for 3 hours. The solid sodium diethyl phosphite was obtained from the reaction mixture by allowing it to stand overnight, filtering and drying the precipitated white solid under vacuum.

Sodium diethyl phosphorothionate was prepared by adding sulfur (16 g., 0.5 mole) to one-half of the sodium diethyl phosphite prepared above together with 600 ml. of the hexane used in preparing the phosphite. Addition of the sulfur was conducted over a period of 30 minutes in 4 equal portions. The whole was then refluxed for 3 hours. At the end of that time the reaction mixture comprising the sodium diethyl phosphorothionate was cooled in an ice bath and 93 g. (0.5 mole) of perchloromethyl mercaptan was gradually added to the cooled mixture. When addition of the mercaptan had been completed, the whole was refluxed for 4 hours and filtered. Distillation of the filtrate to a pot temperature of 105° C./0.5 mm. gave as residue 87.5 g. of a dark brown liquid $n_D^{25}$ 1.5025, $d_4^{20}$ 1.391, analyzing 17.18% sulfur and 24.59% chlorine. Since the respective sulfur and chlorine values for a compound in which only one mole of the perchloromethyl mercaptan is condensed with the phosphorothionate with replacement of the chlorine are 20.07% and 33.26%, respectively, the present analysis indicates that in the instant experiment more than one atom of chlorine has been replaced by a diethyl thionophosphate residue.

The present condensate was extremely toxic to mites which had been transferred to bean plants that had been sprayed with a 0.2% aqueous emulsion of the condensate, the residual toxicity of the spray persisting over an extensive period of time.

Example 8

This example shows the insecticidal activity of the sodium diethyl phosphite-perchloromethyl mercaptan condensate of Example 5. The following testing procedures were used:

(1) *Contact drop application.*—To fifth instar milkweed bugs there was applied a measured drop of the condensate at 1.0 percent concentration in acetone on the dorsal part of the thorax. Application was by means of a micrometer device actuating the plunger of a hypodermic needle.

(2) *Residue test.*—Petri dishes were sprayed with acetone solutions of the condensate at the concentrations shown below. The sprayed dishes were allowed to dry, Tribolium beetles or third instar milkweed bugs were placed on the sprayed and dried surfaces, and confined there for 48 hours. Spraying of the dishes was conducted by means of a precision sprayer in a modified horizontal Hoskins spray chamber.

(3) *Spraying of infested plants.*—Bean plants infested with the 2-spotted mite were sprayed with an atomizer on both leaf surfaces at indicated concentrations of the condensate in a cyclohexanone-water emulsion. The plants are then held for 7 days for observation of kill of mites and their eggs.

(4) *Contact of residue on plants.*—Free bean plants were sprayed with a cyclohexane-water emulsion of the condensate at the indicated concentration, the spray on the plants was allowed to become thoroughly dry, and mites were transferred to plants supporting the dried residue. At the end of 7 days, observation was made of kill of mites.

(5) *Systemic insecticidal effect.*—Plants cut at the ground level were placed in flasks with the cut stem end in a water solution or suspension of the test chemical at the indicated concentration. After 24 hours, mites were placed on the foliage leaf and held there for 10 days, at the end of which time observation of kill of the mites was made.

Employing the above tests the following observations were made:

| Percent Concentration of Condensate | Percent Kill in Test No. — | | | | |
|---|---|---|---|---|---|
| | 1 | 2 | | 3 | | 4 | 5 |
| | | Beetles | Milkweed bugs | Adults | Eggs | | |
| 1.0 | 100 | 100 | 100 | | | | |
| 0.2 | | | | 100 | high | 100 | |
| 0.1 | | 100 | 100 | | | | |
| 0.01 | | | | | | | high |

Other perchloromethyl mercaptan-phosphorus ester condensates which may be used as insecticides include condensates of the mercaptan and potassium diethyl phosphate, potassium di-n-hexyl phosphorothionate, sodium O,O-diethyl phosphorothiolate, etc.

The present condensates are generally applied for insecticidal use in the form of sprays or aerosols. The spray may be prepared by dissolving the condensates in the usual organic solvents, e. g., acetone, hexane, benzene or carbon tetrachloride or by incorporating them into aqueous emulsions. The condensates may also be dissolved in liquefied gases such as the fluorochloroethanes or methyl chloride and applied from aerosol bombs made from the solutions.

Instead of employing liquids as carriers and diluents, insecticidal dusts comprising the present condensates may be prepared. For example they may be incorporated with a solid carrier such as talc, clay, lime, bentonite, pumice, fuller's earth, etc. and employed generally as pesticidal dusts.

What I claim is:

1. An insecticidal composition comprising an inert carrier and as the active ingredient a compound of the formula

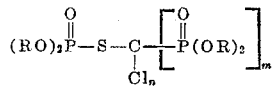

where R is an alkyl group of from 1 to 6 carbon atoms and $m$ and $n$ are integers of from 0 to 3 and the sum of $m+n$ is equal to 3.

2. An insecticidal composition comprising an inert carrier and as the active ingredient a mixture of compounds of the general formula

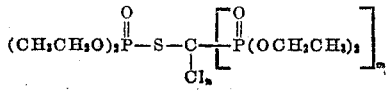

where $m$ and $n$ are integers of from 0 to 3 and the sum of $m+n$ is equal to 3.

3. An insecticidal composition comprising an inert carrier and as the active ingredient O,O-diethyl S-tris(diethoxyphosphinyl)methyl phosphorothiolate, of the formula

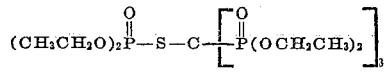

4. The method of controlling insects which comprises applying to a locus to be protected, in an amount sufficient to exert an insecticidal action, a compound of the formula

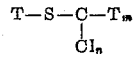

where $m$ and $n$ are integers of from 0 to 3, and the sum of $m+n$ is equal to 3, and T is selected from the group consisting of

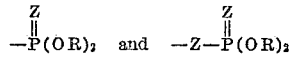

radicals, where R is an alkyl group of from 1 to 6 carbon atoms and Z is a chalkogen element selected from the group consisting of oxygen and sulfur.

5. The method of controlling insects which comprises applying to a locus to be protected, in an amount sufficient to exert an insecticidal action, a compound of the formula

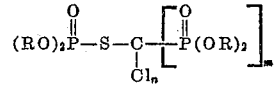

where R is an alkyl group of from 1 to 6 carbon atoms and $m$ and $n$ are integers of from 0 to 3 and the sum of $m+n$ is equal to 3.

6. The method of controlling insects which comprises applying to a locus to be protected, in an amount sufficient to exert an insecticidal action, a compound of the formula

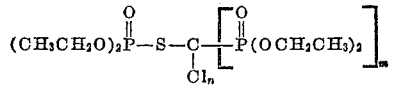

where $m$ and $n$ are integers of from 0 to 3 and the sum of $m+n$ is equal to 3.

7. The method of controlling insects which comprises applying to a locus to be protected, in an amount sufficient to exert an insecticidal action, a compound of the formula

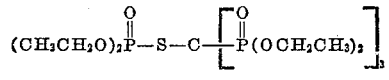

8. A compound of the formula

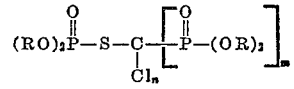

where R is an alkyl group of from 1 to 6 carbon atoms and $m$ and $n$ are integers of from 0 to 3 and the sum of $m+n$ is equal to 3.

9. A mixture of compounds of the formula

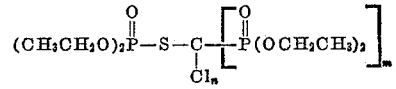

where $m$ and $n$ are integers of from 0 to 3 and the sum of $m+n$ is equal to 3.

10. O,O-diethyl S-tris(diethoxyphosphinyl)methyl phosphorothiolate, of the formula

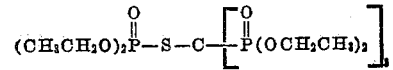

11. The method of controlling insects which comprises applying to a locus to be protected, in an amount sufficient to exert an insecticidal action, a compound of the formula

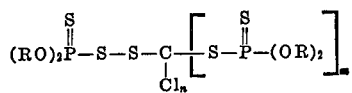

in which R is an alkyl radical of from 1 to 6 carbon atoms, m and n are integers of from 0 to 3, and the sum of $m+n$ is equal to 3.

12. The method of controlling insects which comprises applying to a locus to be protected, in an amount sufficient to exert an insecticidal action, the O,O-diisopropyl S-trichloromethylmercapto phosphorothioate of the formula

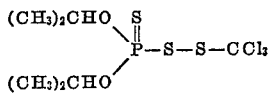

References Cited in the file of this patent

UNITED STATES PATENTS

| | | |
|---|---|---|
| 2,335,953 | McCracken et al. | Dec. 7, 1943 |
| 2,494,126 | Hoegberg | Jan. 10, 1950 |
| 2,494,283 | Cassaday et al. | Jan. 10, 1950 |

FOREIGN PATENTS

| | | |
|---|---|---|
| 646,188 | Great Britain | Nov. 15, 1950 |
| 498,167 | Belgium | Mar. 16, 1951 |